Patented Mar. 2, 1937

2,072,596

UNITED STATES PATENT OFFICE 2,072,596

RUBBER COMPOSITION AND METHOD OF PRESERVING RUBBER

Webster N. Jones, Akron, Ohio, assignor to The B. F. Goodrich Company, New York, N. Y., a corporation of New York No Drawing. Application January 22, 1931, Serial No. 510,514

6 Claims. (Cl. 18—50)

This invention relates to the art of rubber manufacture, and particularly to the preparation of rubber compositions which resist deterioration due to aging or to exposure to the atmosphere. It has long been known that such deterioration can be greatly retarded by treating the rubber either before or after vulcanization with certain substances known as age-resisters or anti-oxidants. The chief object of this invention, then, is to provide a new and superior class of anti-oxidants for rubber.

The substances which are employed as anti-oxidants according to this invention are all tertiary aromatic amines containing two amino groups. The preferred compounds are those in which the two amino groups contain both aliphatic and aromatic substituents. The nucleus of the compounds or the external substituents may, however, contain other substantially neutral groupings, including those of ethers, secondary aromatic amines, etc. However, it is desired to exclude strongly basic substituent groups such as primary amino groups, which are undesirable in compounds of this nature because of their accelerating action, which tends to interfere with normal vulcanization to the extent of inducing prevulcanization or over-vulcanization. It is also desired to exclude strongly acidic substituent groups such as carboxyl or sulphonic acid groups which have the effect of greatly retarding vulcanization, and other groups containing doubly bound oxygen, nitrogen, sulphur, or other inorganic elements, which prove disadvantageous in general either because of a reduced or even a negative anti-oxidant power or because of an undesirably strong effect on the vulcanization of the rubber. Organic disulphides likewise are undesirable because of the fact that they are not only accelerators but are vulcanizing agents in their own right. As the molecular complexity of the compounds is increased, their anti-oxidant activity generally diminishes, while at the same time they tend to become strongly colored. Such colored compounds as the triphenyl-methane dyes are not effective anti-oxidants, but are characterized by the presence of doubly bound oxygen, sulphur or nitrogen, and are therefore excluded from the preferred class herein defined. It will be understood, therefore, that in defining the compounds of this class in the subjoined specification and claims, it is not intended to include compounds containing any substituents other than those expressly specified or than simple hydrocarbon substituents. The term "hydrocarbon" is used to refer to groups or radicals consisting solely of carbon and hydrogen. Compounds in which the tertiary amino groups form part of a ring structure are likewise excluded, for heterocyclic nitrogen atoms do not react in the same manner as ordinary amino nitrogens, nor exhibit the peculiar properties which make the aromatic tertiary amines so valuable for the purpose of this invention.

For example, the following symmetrically substituted tertiary amino compounds are typical members of the class of substances outlined above: diphenyl dimethyl trimethylene diamine, diphenyl dimethyl tetramethylene diamine, tetramethyl diamino diphenyl ethylene diamine, tetramethyl diamino diphenyl dimethyl ethylene diamine, diphenyl dimethyl diamino diethyl ether, tetraphenyl diamino diethyl ether, diphenyl dinaphthyl diamino diethyl ether, diphenyl dimethyl diamino diethyl sulphide, tetramethyl p-phenylene diamine, tetramethyl o-phenylene diamine, tetrabenzyl p-phenylene diamine, diphenyl dimethyl p-phenylene diamine, tetraphenyl p-phenylene diamine, tetramethyl m-toluylene diamine, tetramethyl naphthylene diamine, tetramethyl benzidine, tetramethyl diamino diphenyl methane, tetramethyl diamino diphenyl ether, tetramethyl diamino diphenyl sulphide, tetramethyl diamino diphenyl amine and octamethyl tetramino tetraphenyl ethylene. It will be understood, however, that similar unsymmetrical compounds containing two or more tertiary amino groups may likewise be employed with good effect.

The methods employed in the preparation of these substances will be evident to any skilled organic chemist, hence it will not be necessary to refer in detail to the procedure. However, the preparation of these substances may well be illustrated by the fact that many of the substances may be prepared by reacting a secondary aromatic amine with a halogenated organic compound such as a dihalogenated aliphatic hydrocarbon.

Any one or a mixture of several of the above-enumerated substances or of other equivalent substances falling within the same class may be incorporated into rubber with good effect on its age-resisting properties. For example, from ¼ to 5% of such an anti-oxidant may be mixed with the rubber before vulcanization, the anti-oxidant having substantially no accelerating effect and therefore ordinarily not necessitating an adjustment of vulcanizing conditions. Alternately the anti-oxidant may be applied to the surface of crude or vulcanized rubber, say in the form of a powder, paste, or solution. Rubber so treated resists the deteriorating influence of age and exposure to the elements far better than similar untreated rubber.

As a specific example of one embodiment of the method of this invention, a typical tire tread composition was prepared containing: blended plantation rubbers approximately 100 parts by weight, sulfur 5.5 parts, zinc oxide 30 parts, gas black 40 parts, mineral rubber 10 parts, palm oil 5 parts, and hexamethylene tetramine 0.75 part. This was divided into portions to each of which was added 0.95 part (0.5% of the weight of the composition) of one of the above-described anti-oxidants. The compositions were thoroughly mixed, and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. The anti-ovidants employed in the various compositions were as follows:

A. Tetramethyl benzidine
B. Tetramethyl diamino diphenylmethane
C. Octamethyl tetramino tetraphenyl ethylene
D. Tetrabenzyl p-phenylene diamine
E. Crude tetraphenyl diamino diethyl ether The results of the tests are given in the table below, in which T indicates ultimate tensile strength in pounds per sq. in. and E indicates ultimate elongation in per cent. of original length.

*Aging tests*

| Anti-oxidant | Before aging | | After 7 days in the Geer oven | | After 48 hours in the Bierer-Davis bomb | |
|---|---|---|---|---|---|---|
| | T | E | T | E | T | E |
| A | 3694 | 597 | 2157 | 462 | | |
| B | 3447 | 677 | 2317 | 507 | | |
| C | 3435 | 645 | | | 1820 | 535 |
| D | 3674 | 670 | 2422 | 563 | | |
| E | 3936 | 723 | 2928 | 577 | 2767 | 623 |

The same rubber composition when vulcanized and tested under the conditions without the antioxidants deteriorated from an original tensile strength of about 3600 pounds per square inch and ultimate elongation of 640% to only 1830 pounds and 435% after 7 days in the Geer oven, and 760 pounds and 335% after 48 hours in the Bierer-Davis bomb.

It is evident from the above examples that rubber compositions containing even small proportions of the anti-oxidants of this invention resist deterioration far more effectively than similar untreated compositions.

The reason for the effectiveness of the tertiary aromatic amines described above is not well understood. Other similarly constituted substances containing a single tertiary amino group such as dimethyl aniline have no appreciable effect on the aging of rubber. It appears, therefore, that the presence of at least two tertiary aromatic amino groups in the molecules of the compounds is essential to the present invention. The term "aromatic amino group" indicates that the amino group is directly attached to a ring carbon of at least one aromatic ring.

Obviously, the practice of this invention is not limited to the specific compositions given above, such compositions being merely illustrative of one manner of employing the anti-oxidants of this invention. The anti-oxidants may be employed in conjunction with other known anti-oxidants, or with other vulcanizing agents or accelerators than those here specifically disclosed. The proportions of the constituents may be varied, or other substances may be substituted generally therefor, since this invention is applicable to pure rubber or rubber compositions of the most varied nature.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta-percha, rubber isomers and like products, whether or not admixed with fillers, pigments, vulcanizing or accelerating agents.

This application is a continuation in part of my co-pending application, Serial No. 213,223, filed August 15, 1927, now Patent No. 1,941,012, which discloses the use as an anti-oxidant in rubber of the product of the reaction of p-amino dimethylaniline with ethylene dichloride or ethylene dibromide, which product is identical with the tetramethyl diamino diphenyl ethylene diamine hereinabove recited.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:
1. A rubber composition containing a tetra alkyl substituted benzidine.
2. A rubber composition containing tetramethyl benzidine.
3. The process of retarding oxidation of an oxidizable organic compound which comprises mixing therewith a tetra alkyl substituted benzidine.
4. The process of retarding oxidation of an oxidizable organic compound which comprises mixing therewith tetramethyl benzidine.
5. The process of retarding oxidation of a rubber composition which comprises mixing a tetra alkyl substituted benzidine therewith.
6. The process of retarding oxidation of a rubber composition which comprises mixing tetramethyl benzidine therewith.

WEBSTER N. JONES.